United States Patent [19]

Colbourne

[11] Patent Number: 4,942,306
[45] Date of Patent: Jul. 17, 1990

[54] FIBRE OPTIC SENSOR FOR THE CONTINUOUS MEASUREMENT LIQUIDS LEVEL AND OTHER PARAMETERS

[75] Inventor: Paul D. Colbourne, Dartmouth, Canada

[73] Assignee: Focal Technologies Incorporated, Dartmouth, Canada

[21] Appl. No.: 292,111

[22] Filed: Dec. 30, 1988

[51] Int. Cl.$^5$ .................................... G01N 15/06
[52] U.S. Cl. ............................ 250/577; 250/903
[58] Field of Search ............ 250/227, 577, 357, 365; 73/293; 350/96.1

[56] References Cited

U.S. PATENT DOCUMENTS

| | | | |
|---|---|---|---|
| 3,995,168 | 11/1976 | Neuscheler et al. | 250/577 |
| 4,119,860 | 10/1978 | Gooley | 250/577 |
| 4,246,489 | 1/1981 | Yoshida et al. | 250/227 |
| 4,287,427 | 9/1981 | Scifres | 250/577 |
| 4,354,180 | 10/1982 | Harding | 250/577 |
| 4,403,826 | 9/1983 | Presby | 250/372 |
| 4,440,022 | 4/1984 | Masom | 73/293 |
| 4,650,992 | 3/1987 | Ruhrmann | 250/227 |
| 4,788,444 | 11/1988 | Williams | 73/293 |

FOREIGN PATENT DOCUMENTS

| | | |
|---|---|---|
| 913927 | 11/1972 | Canada . |
| 1087269 | 10/1980 | Canada . |
| 1102151 | 6/1981 | Canada . |
| 1115084 | 12/1981 | Canada . |
| 1154117 | 9/1983 | Canada . |
| 1190762 | 7/1985 | Canada . |

OTHER PUBLICATIONS

"Innovations", Oct. 1987, vol. 2, No. 1, pp. 6–7.
Belkerdid .et al; "Fiber Optic Fluid Level Sensor", SPIE vol. 566, Fiber Optic and Laser Sensors III (1985), pp. 153–158.
K. Spenner et al; "Experimental Investigations on Fiber Optic Liquid Level Sensors and Refractometers"; pp. 96–99.

Primary Examiner—David C. Nelms
Attorney, Agent, or Firm—Jones, Tullar & Cooper

[57] ABSTRACT

A fibre optic sensor, particularly for ascertaining fluid levels, utilizes at least two optical fibres having at least a portion thereof embedded in a transparent substrate material of similar refractive index. One of the fibres is coupled to a light source, the other to a light detector. The source fibre illuminates the interior of the substrate so that light exiting the source fibre is coupled to the detector fibre when total internal reflection at the substrate/fluid interface occurs in the presence of a first fluid. In the presence of a second fluid of higher refractive index than the first fluid, there will be no coupling, due to the loss of light into the fluid by refraction. The mechanism for coupling light into the detector fibre is fluorescence within that fibre causing it to provide a light signal which varies with the level of the second fluid. Several different embodiments, to achieve continuous level sensing or the sensing of other parameters, are disclosed. As well, the issue of lead fibre insensitivity to changes in optical attenuation is addressed through a novel scheme which requires two light sources and two light detectors and utilizes the self attenuation of the fluorescent optical fibre to achieve a ratiometric measurement.

17 Claims, 2 Drawing Sheets

FIBRE OPTIC SENSOR FOR THE CONTINUOUS MEASUREMENT LIQUIDS LEVEL AND OTHER PARAMETERS

This invention relates to a method and apparatus for optically detecting A liquid level or other physical parameters.

BACKGROUND OF THE INVENTION

Conventionally, the level of a liquid in a vessel is detected using a float with a mechanical or magnetic coupling to an external gauge, an ultrasonic or optical transducer which measures time of flight to deduce the liquid level, or a parallel wire capacitance sensor which monitors the change in the dielectric constant between the wires associated with a change in liquid level.

The application of fibre optics to level sensing in liquids is well documented. The principal advantages of this type of level sensor are its passivity, i.e., no moving or mechanical parts, and its intrinsic dielectric properties which mean no spark hazard when used with combustible fluids and virtually zero susceptibility to electromagnetic interference. The more common implementations use small prisms mounted at the end of two optical fibres, a conically shaped optical fibre tip, or a U-shaped bent optical fibre [Canadian Patent 1102151](devices of these types are described for example in the article "Experimental Investigations on Fibre Optic Liquid Level Sensors and Refractometers" by K. Spenner et al—IEE OFS 221 pages 96–99). In all instances, the optical fibre probe or sensor is suspended or made to protrude into the vessel, and the potentially fragile sensor is exposed to damage by floating debris, vibration, and dynamic effects during filling. The potential for damage is increased if routine maintenance of the sensor is required due to biological or chemical fouling of the optical surface.

A more rugged optic level sensor is described in U.S. Pat. Application Ser. No. 07/168,481, Alpert et al., filed Mar. 15, 1988 wherein the source and detector fibres are embedded in an optically transparent substrate material, thereby providing protection for the sensor and a suitable window for cleaning.

The fibre optic sensors just described are primarily for discrete level measurement, e.g., to sense whether the vessel is empty or full or at some intermediate point. A multiplicity of such point sensors generally represents an impractical configuration for a continuous liquid level measure. A continuous measure is desirable, however, for improved resolution in many applications. Consider the case of an aircraft fuel gauging system. The dielectric properties of the optical fibre sensor are desirable from the point of view of safety with respect to spark hazard and lightning strikes but high resolution and accuracy are also desirable so that excess fuel quantities would not have to be carried thus reducing aircraft weight and consequently fuel consumption. Present day aircraft fuel level sensors are for the most part capacitance type sensors which lose accuracy when the fuel becomes laden with water and the dielectric constant is changed significantly.

Only two continuous fibre optic liquid level sensors have been found reported thus far. The first is "Fibre Optic Fluid Level Sensor" by M. Belkerdid, N. Ghandeharioun, and B. Brennan in the Proceedings of SPIE Conference 566 Fibre Optic and Laser Sensors III (1985) pages 153–158. Based on the bending or cladding loss principle, it consists of large loops of a single fibre, the loops being of ever increasing diameter, which are suspended in the liquid. Here again, the sensor packaging is not sufficiently robust for most applications.

The second is U.S. patent application Ser. No. 07/168,481, Alpert et al., which, inter alia teaches a fluorescent doped detector fibre to collect light reflected from a source fibre in the presence of air; the light is refracted away when a fluid of higher refractive index is present. Hence the output signal is analogous to the fluid level.

SUMMARY OF THE INVENTION

I describe a simple configuration based on the total internal reflection principle used in the prism and cone type sensor, and in the sensors described in U.S. patent application Ser. No. 07/168,481, now U.S. Pat. No. 4,870,292 in which the optical fibres are embedded in an optically transparent substrate material that provides for protection of the sensor and also provides a surface which can be cleaned.

It is well known that the relative refractivity and hence the critical angle of total reflection at an interface is dependent on the indices of refraction of the two media forming the interface. This is more often referred to as Snell's law, $N_1 \sin\theta_1 = n_2 \sin\theta_2$, which describes the relationship between the angles of incidence $\theta_1$ and refraction $\theta_2$ for a light ray propagating in a medium of refractive index $n_1$, incident on a medium of refractive index $n_2$. Using this equation it is evident that for $n_1 > n_2$ there is a limiting angle of incidence called the critical angle, given by the arcsine of the ratio of the refractive indices, beyond which total internal reflection occurs.

In this discussion, the terms "liquid" and "air" are used to refer to any two fluids of sufficiently different refractive indices to be sensed by this refractometric technique. Hence "air" might equally well refer to the gaseous phase of the sensed liquid or to another liquid as in the case of oil and water. Similarly, the term "optical fibre" is used to describe any elongated light conducting body or light guide capable of conveying light by multiple internal reflections.

The continuous liquid level sensor described herein consists of two optical fibres, a source or transmit optical fibre having one end adapted to be optically connected to an external light source, and a detector or receive optical fibre having one end adapted to be optically connected to an external light detector. The souce optical fibre has at least the other end thereof embedded in an optically clear substrate material or window that is in contact with the liquid to be sensed such that the light exiting the source fibre is incident on the substrate to liquid or air interface at an angle between the critical angle for the liquid and the critical angle for air. The substrate or window material has a refractive index equal or nearly equal to that of the core of the optical fibre so that the maxium refractive index mismatch will occur at the interface to the liquid. A fluorescent detector fibre is mounted within the substrate so that it can receive any light from the source which is internally reflected from the interface. Hence a received light signal will occur at the external light detector only when a portion of the sensor is exposed to air. A mechanism can be easily included to provide for detection of any failure in the sensor's optical path from and including the light source to the detector.

The device may be made to measure parameters other than fluid level (such as displacement, temperature, pressure, etc.) by the addition of a sleeve external to the substrate, the motion of which is driven by the change in the parameter to be measured. The sleeve would cause variation in the output signal by the same reflection/refraction principle described above.

DESCRIPTION OF THE PREFERRED EMBODIMENT

Figure 1:
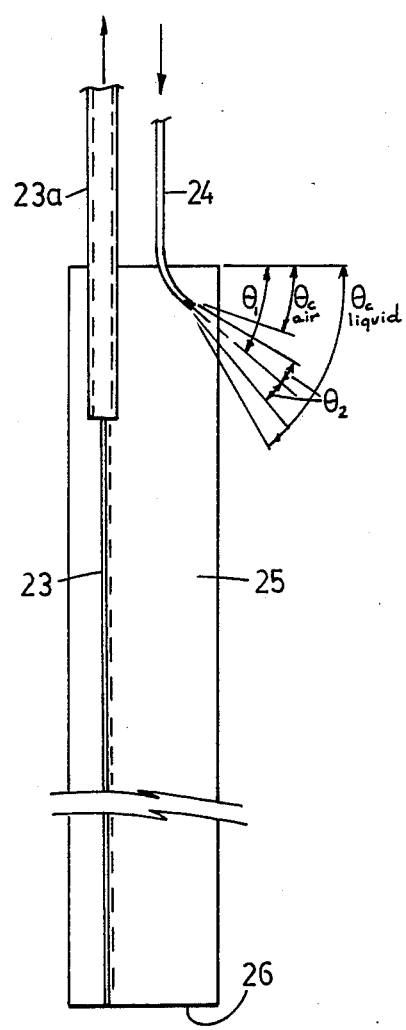
FIG. 1 shows a general view of the continuous level sensor described in the invention.

In FIG. 1, the source optical fibre 24 is inserted in the substrate at an angle $\theta_1$ to illuminate the inner surface of the substrate 25. The numerical aperture (NA) of the source fibre is given by $n_s \sin\theta_2$ where $n_s$ is the refractive index of the substrate. The source fibre NA should be chosen so that $2\theta_2 \leq [(\theta_c)_{liquid} - (\theta_c)_{air}]$, for maximum sensor efficiency. Then the angle $\theta_1$ is chosen such that $\theta_1 - \theta_2$ is greater than the critical angle for air and $\theta_1 + \theta_2$ is less than the critical angle for the liquid to be sensed.

If air is present at the surface of the substrate, the light is totally internally reflected as in any optical waveguide and propagates toward the opposite end of the sensor. If liquid is present at the surface, some or all of the light is refracted out and lost.

Figure 2:
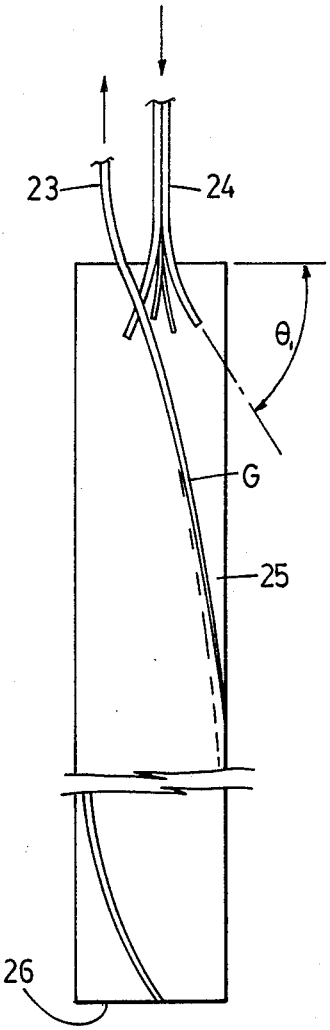
FIG. 2 is similar to FIG. 1 except that the source optical fibre 24 is replaced with a bundle of optical fibres.

The fluorescent detector optical fibre 23 intercepts a fraction of the light which is totally internally reflected resulting in an optical intensity output at the end of the detector fibre which increases continuously according to the length of the substrate which is above the liquid level. Although the sensor may have a square or rectangular cross section, in the preferred embodiment, the substrate waveguide is circular and a bundle of optical source fibres is splayed radially as seen in FIG. 2 to illuminate the core of the sensor as uniformly as possible an the fluorescent fibre 23 is embedded in the substrate near its surface, along the sensor's lenght. This ensures that the predominant skew rays are detected unless refracted away into the liquid. A detector fibre along the axis of the sensor would be susceptible only to the fewer meridional rays and the sensor would not be as sensitive. The detector fibre should be shrouded as at 23a near the top of the sensor in the region where the substrate surface is not yet fully and uniformly illuminated.

If the detector fibre 23 is laid in a helical groove G in the substrate, the pitch of the helix can be varied, i.e. decreased, along the length of the sensor to offset any attenuation of the optical source along the sensor's length or to provide a linear response for irregular tank shapes. A longitudinal linear lay of the detector fibre as shown in FIG. 1 may, however, facilitate manufacturability of the sensor.

If the end 26 of the substrate 25 is made to be reflecting, then when the fluid level falls below the end 26 of the substrate 25, the light from the fibre or fibres 24 will propagate along the entire length of the substrate 25, be reflected by the mirrored end 26, and propagate back up the substrate 25. The fluorescence induced in the fibre 23 will thus increase abruptly due to illumination by both the downward propagating and upward propagating light in the substrate 25 when the entire substrate 25 is out of the fluid. If any portion of the substrate 25 is surrounded by fluid, the light will be refracted out of the substrate 25 and will not reach the end 26. The mirrored end 26 thus can provide a large "empty tank" signal when the sensor is used to measure fluid level in a tank.

If the end 26 is made to be non-reflecting, then the induced fluorescence will continue to increase smoothly near the bottom of the sensor. This would simplify linearization of the sensor output.

In the course of presenting the preferred embodiment of the invention, certain background assumptions have been made regarding components that are common to fibre optic devices. For example, the light source may be a light emitting diode, laser diode, flash tube such as a xenon strobe or a more conventional source. The detector may be a photodiode, phototransistor or photomultiplier. Some fluid or epoxy, of a refractive index which matches that of the optical fibre core material and the substrate material, may be placed in the holes or grooves in the substrate which contains the fibres, thereby minimizing any optical loss due to refractive index mismatch (Fresnel loss). The fibre ends may be polished using standard lapping film techniques or may be simply cleaved or cut.

The key to the invention is the fluorescent substance used to dope the core of the detector fibre. When irradiated or excited with a relatively short wavelength optical source, it re-emits light of a longer wavelength. Normally, light passing transverse to and through an non-fluorescent optical fibre, that is unguided light, is not coupled into the optical waveguide because its angle of incidence exceeds the critical angle defined by the core and cladding indices. However, in the fluorescent optical fibre, the fluorescent sites emit spherically within the fibre; a portion of this longer wavelength emission is within the cones of light which are within the numerical aperture of the detector fibre and therefore will remain as guided light in the fibre's core and will propagate to both ends of the fibre, at least one of which is connected to the detector.

Figure 4:
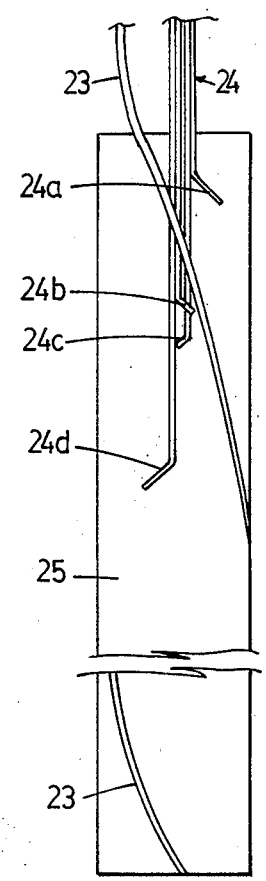
FIG. 4 shows a detector fibre made up of discrete sensing portions.
Figure 5:
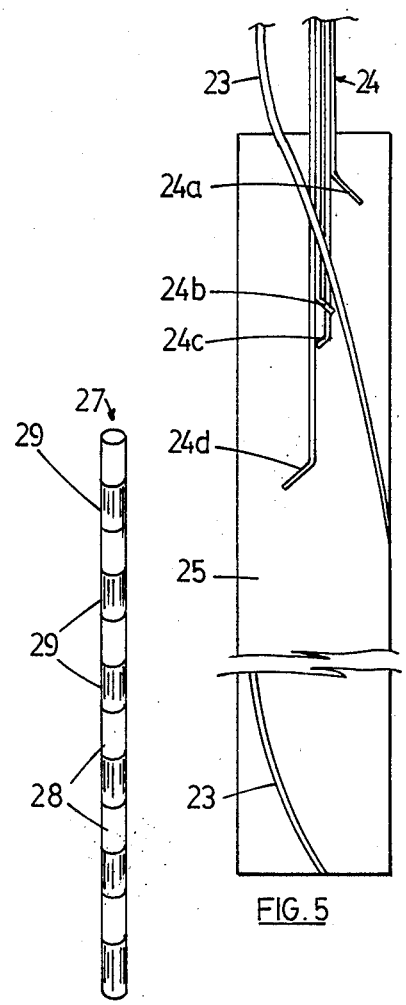
FIG. 5 show a sensor in which a plurality of source fibres is arranged at different levels within the substrate.

A stepwise or "digital" output could be achieved by replacing the detector fibre with a fibre 27 made up of a series of fluorescent fibre segments 28 joined by segments of non-fluorescent fibre 29 (FIG. 4). Such an arrangement would be tolerant to signal variations imposed by varying enviromental conditions, as the presence of a signal within a certain range would be known to represent a specific level. A stepwise output could also be obtained by retaining the fluorescent detector fibre but changing the arrangement of the source fibres in the bundle 24 such that each source fibre 24 $a$, $b$, $c$, $d$ ... terminates at a different distance along the length of the substrate (FIG. 5). The output would thereby give a "count" of the number of source fibres exposed and hence indicate the level. Either of these step-output arrangements could be arranged non-linearly to provide liquid quantity measurement (as opposed to level) in irregularly shaped tanks.

The continuous level sensor described herein is an intensity-type sensor, since the intensity of the fluorescent signal indicates the fuel level. Intensity type sensors are sensitive to changes in source intensity, detector responsivity, or attenuation in the optical fibres and connectors leading to and from the sensor, all of which will affect the detected optical intensity. It is often impossible to tell the difference between one of the changes listed and a real change of the measured quantity. However, variations in lead fibre attenuation can not be tolerated by the sensor, as previously described, if the light source and light detector are remote from the sensor. Special techniques must be used to eliminate the sensitivity to lead fibre attenuation.

Techniques which have been used in the past to reduce lead fibre sensitivity include multiple pass pulses, wavelength referencing, polarization, Doppler few mode, and reference path techniques. Of these, only wavelength referencing can be easily applied to the present invention with the penalty being the addition of various couplers and wavelength multiplexers. A reflection/transmission technique using two light sources and two detectors has recently been reported by Beheim and Anthan (*Applied Optics,* 27 p. 2767, 1988). This technique can be modified for use with the fluorescent fibre fuel probe as follows.

Figure 3:
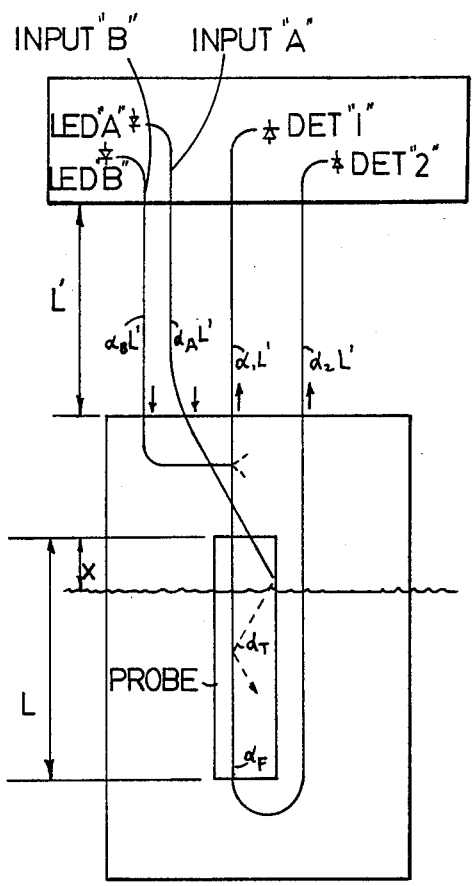
FIG. 3 shows a level sensor using two sources and two detectors.

In this method, two outputs are required which have different intensity vs. fuel level curves. For the rod type prode, suitable outputs are the top and bottom ends of the fluorescent fibre. These two outputs behave differently because of the self-attenuation of the fluorescent fibre (the attenuation of the fluorescence signal as it propagates in the fluorescent fibre). In addition, two inputs are required which cause different responses at the outputs. One input can be the normal source fibre. The second input can be a fibre simply butted perpendicularly against the fluorescent fibre outside the fuel-sensing portion of the prode. The resulting configuration is shown in FIG. 3.

To take a reading, the procedure is to first turn on source B only, and measure $P_{1B}$ and $R_{2B}$, the optical powers at detectors 1 and 2 respectively. Then turn on source A and measure $P_{1A}$ and $P_{2A}$. The quantity $$Y = \frac{P_{1B}P_{2A}}{P_{1A}P_{2B}} \quad \text{(Equation I)}$$

is then calculated, which varies monotonically with the fuel level x and is independent of the attenuations in all four lead fibres. The theoretical expression for Y is, $$Y = \left(\frac{\alpha_T + \alpha_F}{\alpha_T - \alpha_F}\right)\left(\frac{1 - e^{-(\alpha_T - \alpha_F)x}}{1 - e^{-(\alpha_T + \alpha_F)x}}\right) \quad \text{(Equation II)}$$

where $\alpha_T$ is the attenuation coefficient for pump light travelling down the probe, and $\alpha_F$ is the self-attenuation coefficient of the fluorescent fibre. As the level X changes so will the quantity Y and it is an easy enough exercise, perhaps accomplished by a microcomputer, to calculate and display the fuel level X, using the equations above.

The embodiments of the invention in which an exclusive property or privilege is claimed are defined as follows:

1. An indicating device for showing the level of the interface between two fluids in a container, wherein one fluid has a higher index of refraction than the other, comprising at least two optical fibres, each having at least a portion thereof embedded in a transparent substrate material of similar refractive index to that of the fluid with a higher refractive index, one of said fibres being a source fibre optically connected to a light source, the other being doped with a fluorescent doping material and being a detector fibre optically connected to a detector, the fibres being arranged within the substance such that light emitted from said source fibre illuminates the interior of the substrate, which serves as a larger waveguide, and (a) is coupled into said detector fibre when total internal reflection occurs at the substrate/fluid interface, which is the case when air or a fluid of relatively low refractive index is present, or (b) is not coupled into said detector fibre when refraction occurs at the substrate/fluid interface, which is the case when the fluid of higher refractive index, namely the fluid whose level is to be measured, is present.

2. The device of claim 1, wherein said source fibre is made to emit a particular wavelength or range of wavelengths of light so as to excite longer wavelength fluorescence in said detector fibre only when total internal reflection occurs within the substrate.

3. The device according to claim 2, wherein the substrate or waveguide is circular in cross section.

4. The device according to claim 3, wherein the fluorescent detector fibre extends longitudinally of the substrate and is positioned eccentrically of a central axis of the substrate so as to intercept predominant skew rays.

5. The device according to claim 3, wherein the fluorescent detector fibre extends helically along and around the substrate over its length so as to intercept predominant skew rays.

6. The device according to claim 5 wherein the pitch of the detector fibre helix is decreased to compensate for attenuation of the light source along the length of the substrate.

7. The device according to claim 3, wherein the fluorescent detector fibre is shrouded from the source illumination near the top of the substrate in the region where the substrate core is not yet fully and uniformly illuminated.

8. The device according to claim 3, wherein the end of the substrate opposite the source is mirrored to provide an abrupt increase in fluorescence when the fluid level drops below the end of the substrate.

9. The device according to claim 3, wherein the end of the substrate opposite the source is made non-reflecting to simplify linearization requirements.

10. The device according to claim 2 wherein the source fibre is angled with respect to the substrate/fluid interface such that its numerical aperture satisfies the principle of total internal reflection within the substrate unless the fluid to be sensed is present.

11. The device according to claim 3 including a bundle of source fibres, with each source fibre of said bundle being splayed radially to more uniformly illuminate the interior of the substrate and increase light level for improved sensor performance.

12. The device according to claim 4 wherein the detector fibre has segments of the fluorescent-doped material located there along and separated by segments of non-fluorescent fibre.

13. The device according to claim 5 wherein the detector fibre has segments of the fluorescent-doped material located there along and separated segments of non-fluorescent material.

14. The device according to claim 11 wherein the detector fibre has segments of the fluorescent-doped material located there along and separated by segments of non-fluorescent material.

15. The device according to claim 11 wherein the fibres making up the bundle of source fibre are cut to different lengths and mounted at different distances along the substrate.

16. The device according to claim 1 wherein two of said source fibres and two of said detector fibres are used to provide insensitivity to variations in lead fibre attenuation, source intensity, and detector responsivity.

17. The device according to claim 5 wherein the pitch of the detector fibre helix is varied to provide a linear response for irregular tank shapes.

* * * * *